Patented Mar. 15, 1938

2,111,201

UNITED STATES PATENT OFFICE 2,111,201

DRYING OF YEAST

Harold Allden Auden, Banstead, and Philip Eaglesfield, Sutton, England, assignors to Standard Brands Incorporated, New York, N. Y.

No Drawing. Application October 31, 1933, Serial No. 696,024. In Great Britain November 2, 1932

7 Claims. (Cl. 195—58)

The present invention relates to the drying of yeast and has for its chief object the preparation of a dried yeast of high baking activity which can be maintained for long periods during storage.

It has already been proposed to improve the drying of yeast by incorporating with it a substance such as dry starch or nitrogenous colloid materials such as gelatin.

According to the present invention an active dried yeast preparation is produced which retains its baking activities unimpaired during storage by incorporating with the yeast either before drying or during the drying period relatively small amounts of non-nitrogenous colloid material such as substances of a pectinous or mucilaginous nature. Such compounds are tasteless and non-injurious to health, and do not affect in any way the subsequent use of the yeast for bread-making or other purposes. Suitable substances for example are pectins obtained from fruits such as apples, citrous fruits and the like, and the mucilage obtained by the aqueous extraction of linseed.

The colloid may be used in amounts up to 10% of the dry matter of the yeast. Small amounts are quite sufficient, larger amounts representing merely an ineffective surplus.

The following examples are illustrative of the manner of carrying the invention into effect:—

*Example I.*—A quantity of commercial apple pectin solution equal in weight to four per cent. of the dry matter in a mass of pressed yeast to be dried was mixed with the yeast and the mixture was extruded and dried for six hours on a static drier at 30° C. The dry yeast obtained had a moisture content of eleven per cent. and good baking strength, and at the end of fifteen weeks the baking strength had not altered materially.

*Example II.*—The same amount of apple pectin solution as mentioned in Example I was mixed with yeast cream coming from a standard form of yeast separator and the mixture was then passed to a drum drier and partially dried thereby at 30° C. The drying was then continued in a static drier at 30° C. as in Example I. The moisture content was approximately twelve per cent. and at the end of seventeen weeks the baking strength had not materially altered.

In place of the above-mentioned apple pectin solution an equal amount of commercial citrous pectin solution may be employed, or a mucilage obtained by making a cold water extract of an amount of linseed equal to ten per cent. of the dry matter in the yeast can be used.

Dried yeast preparations prepared in the above manner are suitable for baking purposes and are of value also medicinally.

There is evidence to show that during the drying of yeast, the yeast cells can be killed by a too abrupt withdrawal of water from the cells, and it would appear that the colloid materials that we incorporate with the yeast have the property of protecting the yeast cells from the effect of this sudden withdrawal of water. It would appear also that the pectin and other mucilage act as stabilizers during the storage of the yeast in that they help to maintain the water present in the dried product in the correct amount to enable the cells to keep their vitality unimpaired during a long period.

Since certain changes may be made in carrying out the above process and certain modifications in the dried yeast which embody the invention may be made without departing from its scope, it is intended that all matter contained in the above description shall be interpreted as illustrative and not in a limiting sense.

What we claim is:—

1. In the preparation of dried yeast, the steps of incorporating in the yeast to be dried an amount of a tasteless non-nitrogenous colloid material non-injurious to health belonging to the group consisting of a pectin and an extract of linseed not exceeding 10 per cent. of the dry matter of the yeast and then drying at a temperature upwards to 30° C.

2. In the preparation of dried yeast, the steps of incorporating in the yeast to be dried an amount of a pectin solution not exceeding 10 per cent. of the dry matter of the yeast and then drying at a temperature upwards to 30° C.

3. In the preparation of dried yeast, the steps of incorporating in the yeast to be dried an amount of an extract of linseed not exceeding 10 per cent. of the dry matter of the yeast and then drying at a temperature upwards to 30° C.

4. As an article of manufacture a composition containing dried yeast and a quantity of a tasteless non-nitrogenous colloid material non-injurious to health belonging to the group consisting of a pectin and an extract of linseed not exceeding 10 per cent. of the dry matter of the yeast.

5. As an article of manufacture a composition containing dried yeast and an amount of pectin not exceeding 10 per cent. of the dry matter of the yeast.

6. As an article of manufacture a composition containing dried yeast and an amount of an extract of linseed not exceeding 10 per cent. of the dry matter of the yeast.

7. In a process for the preparation of dried yeast the steps which comprise incorporating a pectin solution in an amount of about 4% by weight of the dry matter of yeast with a pressed yeast, and drying at a temperature of about 30° C.

HAROLD ALLDEN AUDEN.
PHILIP EAGLESFIELD.